United States Patent
Yumita

[19]

[11] Patent Number: 5,822,281
[45] Date of Patent: Oct. 13, 1998

[54] DISK APPARATUS AND DISK ACCESS METHOD EMPLOYING COUNTERELECTROMOTIVE VOLTAGE FROM SECOND VOICE COIL MOTOR TO CONTROL FIRST VOICE COIL MOTOR

[75] Inventor: Motoyasu Yumita, Kanagawa, Japan

[73] Assignee: Sony Corporation, Toyko, Japan

[21] Appl. No.: 805,507

[22] Filed: Feb. 26, 1997

[30] Foreign Application Priority Data

Feb. 28, 1996 [JP] Japan .................................. 8-041784

[51] Int. Cl.⁶ ............................................. G11B 11/00
[52] U.S. Cl. ............................................. 369/13; 360/114
[58] Field of Search ............................ 369/13, 24, 219, 369/56, 32, 44.14, 54, 77.2, 14, 44.39; 360/78.07, 78.04, 59, 75.2, 105, 107, 109; 318/254, 439

[56] References Cited

U.S. PATENT DOCUMENTS

| | | | |
|---|---|---|---|
| 4,955,011 | 9/1990 | Baba ......................................... | 369/54 |
| 5,012,166 | 4/1991 | Ushigima et al. ...................... | 318/254 |
| 5,604,719 | 2/1997 | Kahimoto et al. ..................... | 364/13 |
| 5,668,787 | 9/1997 | Shigematsu et al. .................... | 369/13 |

*Primary Examiner*—Ali Neyzari
*Attorney, Agent, or Firm*—Limbach & Limbach, LLP

[57] ABSTRACT

A disk apparatus according to the present invention includes a rotating means for rotating a disk, a head for accessing the disk, and a head moving means of moving the head in the radius direction of the disk. The head moving means includes a first voice coil motor as a drive source used when the head is moved, a second voice coil motor as a drive source used when the head is moved, a head guide means for guiding the head in the radius direction of the disk when the head is moved, a drive means for supplying a drive signal to the first voice coil motor during a first period in which the head is moved to a predetermined position on the disk and for supplying the drive signal to the first voice coil motor and the second voice coil motor during a second period in which the head is moved from the predetermined position on the disk to another position thereon, and a counterelectromotive voltage detecting means for detecting a counterelectromotive voltage from the second voice coil motor when the drive signal is not supplied to the second voice coil motor. The drive means drives the first voice coil motor based on an output from the counterelectromotive voltage detecting means so that the head should be moved to the predetermined position on the disk.

30 Claims, 9 Drawing Sheets

DISK APPARATUS AND DISK ACCESS METHOD EMPLOYING COUNTERELECTROMOTIVE VOLTAGE FROM SECOND VOICE COIL MOTOR TO CONTROL FIRST VOICE COIL MOTOR

BACKGROUND OF THE INVENTION

The present invention relates to an optical disk apparatus and particularly to a control system for moving an optical head for optically accessing to an optical disk loaded thereonto to read an information signal, to a predetermined position by a voice coil motor (VCM), for example.

A general optical disk apparatus employs a voice coil motor (VCM) as a drive source of an optical head sliding mechanism (actuator) for moving an optical head in a radius direction of an optical disk.

One of important factors for improving a performance of an optical disk apparatus is an operation of moving an optical head to a predetermined position, i.e., a high speed seek operation. A bang-bang control has been known as a most suitable control method for the seek operation.

Since, when an actuator using the above VCM is employed, an acceleration (angular acceleration) of the VCM is proportional to a voltage applied thereto, an allowed maximum voltage of the actuator determined by specification of the actuator is applied to the VCM when a speed of the seek operation is increased, and a maximum voltage thereof having a reverse polarity is applied to the VCM when the speed of the seek operation is decreased. Thus, a maximum speed of the seek operation can be obtained.

In this case, practically, a profile of a movement distance of an optical head is calculated for every desired seek distance based on a maximum voltage obtained in consideration of difference among drive devices, and is given to a seek servo system (feedback system) as a reference movement amount. Thus, it is possible to realize a high-speed seek operation which can cancel various differences among devices as much as possible.

Specifically, when a seek operation of moving an optical head by a certain distance (i.e., a distance represented by tracks of a certain number), a distance (movement amount) by which the optical head should move at each time during the seek operation is previously or successively calculated, being compared with an actual movement amount of the optical head. A difference signal indicative of the difference between the calculated distance and the actual distance is supplied to a drive unit of a sled mechanism. Thus, the seek servo control can be realized.

Before the optical head accesses the optical disk, the optical head must read an attribute information of the optical disk. The attribute information includes a medium information such as sensitivity, reflectivity or the like and a system information such as a track number or the like.

Especially, a 5-inch magneto-optical (MO) disk includes a phase information other than the above medium information and the above system information. The phase information is located at a phase-encoded part (PEP) on an optical disk, and the medium information and the system information are located at a standard formatted part (SFP) thereon.

As shown in FIG. 1, the attribute informations located at the PEP (i.e., the phase information) is recorded on an optical disk D at a control track PEP zone which is located at an outer-periphery side position as compared with a reflectivity zone at most inner peripheral position of the optical disk D. The attribute informations located at the SFP (i.e., the medium information and the system information) are recorded on an optical disk D at an inner control track SFP zone located at outer periphery side of the above control track PEP zone and at an outer control track SFP zone located at an inner periphery side of a read-out zone at an outermost periphery of the optical disk D.

Various methods of making the optical head accessing the above attribute informations have been proposed. The three typical methods thereof are as follows.

(1) As shown in FIG. 2, according to a first method, there is provided an optical head position detecting mechanism having an optical-head position sensor 101 of an optical head 104 formed of a linear encoder or the like provided near the inner periphery of the optical disk D other than a linear encoder (not shown) used upon the seek operation of accessing the attribute informations, and a stopper 103 provided in an outer housing of a spindle motor 102 for rotating the optical disk D (this first method is disclosed in Japanese laid-open patent publication NO. 250688/1990).

According to the first method, the optical head 104 is initially moved to an inner periphery side of the optical disk D., i.e., a position where it is to be in contact with the stopper 103. Thereafter, a slight current flows through a VCM, thereby the optical head 104 being finely moved toward an outer periphery side of the optical disk D. When the optical head 104 is finely moved, a position of the PEP zone is detected based on a detection signal output from the position sensor 101 and, for example, a focus error signal output from the optical head 104, and the optical head 104 reads out a PEP information from the detected PEP zone.

(2) As shown in FIG. 3, according to a second method, an elastic (or springy) member 105 formed of an elastic rubber, a spring or the like is provided instead of the stopper 103 employed in the first method.

According to the second method, the optical head 104 is moved to the inner periphery side of the optical disk D, i.e., in the direction in which the member 105 is pressed by the optical head 104 against its elasticity (or spring force). Thereafter, while the PEP zone is being detected based on the focus error signal from the optical head 104, for example, a pressing force of the VCM which serves to press the optical head 104 is gradually loosened, thereby the optical head 104 being returned to a position corresponding to the PEP zone.

(3) Though not shown, according to a third method, the optical head is initially moved to a position corresponding to the innermost periphery position of the optical disk, thereafter being finely and gradually moved from the innermost periphery to the PEP zone without using any sensor or the like. Based on informations of time required for the movement of the optical head from the innermost periphery to the PEP zone and so on, a most preferable positioning drive force is learned and controlled.

However, the above first to third methods may involve the following problems.

Specifically, the first method requires the position sensor 101 formed of a linear encoder or the like which must be newly provided in an optical head slide mechanism. This may lead to disadvantage in manufacturing costs.

The second method requires the elastic member 105, which leads to disadvantage in manufacturing costs. Moreover, the elastic member 105 required in the second method is disadvantage in durability.

The third method inevitably employs an operation of moving the optical head from the innermost periphery to the PEP zone many times to carry out the most preferable positioning control based on the time required for such movement. This may limit possibility of a faster access time.

SUMMARY OF THE INVENTION

In view of such aspects, it is an object of the present invention to provide a disk apparatus and a disk access method which, with low costs and with high reliability, allows an attribute information reading operation carried out at the preceding stage of an operation of accessing a disk and which allows the above attribute information to be read at high speed.

According to a first aspect of the present invention, a disk apparatus according to the present invention includes a rotating means for rotating a disk, a head for accessing the disk, and a head moving means of moving the head in the radius direction of the disk. The head moving means includes a first voice coil motor as a drive source used when the head is moved, a second voice coil motor as a drive source used when the head is moved, a head guide means for guiding the head in the radius direction of the disk when the head is moved, a drive means for supplying a drive signal to the first voice coil motor during a first period in which the head is moved to a predetermined position on the disk and for supplying the drive signal to the first voice coil motor and the second voice coil motor during a second period in which the head is moved from the predetermined position on the disk to another position thereon, and a counterelectromotive voltage detecting means for detecting a counterelectromotive voltage from the second voice coil motor when the drive signal is not supplied to the second voice coil motor. The drive means drives the first voice coil motor based on an output from the counterelectromotive voltage detecting means so that the head should be moved to the predetermined position on the disk.

According to a second aspect of the present invention, a disk access method according to the present invention is a method of accessing a predetermined position on a disk in a disk apparatus having a first voice coil motor as a drive source used when a head is moved in the radius direction of the disk and a second voice coil motor as a drive source used when the head is moved in the radius direction of the disk. The disk access method includes a counterelectromotive voltage detecting step of detecting a counterelectromotive voltage from the first voice coil motor, a first target movement speed referring step of referring to a first target movement speed of the head used when the head is moved to an innermost or outermost periphery of the disk, a head moving step of driving the voice coil motor based on the counterelectromotive voltage and the first target speed to move the head to the innermost or outermost periphery, a detecting step of detecting that the head reaches a position corresponding to the innermost or outermost periphery, a second target movement speed referring step of referring a second target movement speed of the head used when the head is moved from the innermost or outermost periphery to the predetermined position, a head moving step of driving the second voice coil motor based on the counterelectromotive voltage and the second target movement speed to move the head to the predetermined position, and a predetermined position detecting step of detecting that the head reaches the predetermined position.

DESCRIPTION OF THE PREFERRED EMBODIMENT

An optical disk apparatus according to an embodiment of the present invention will be described with reference to FIGS. 4 through 10. In this embodiment, the optical disk apparatus according to the present invention is applied to a magnetic-field modulation type recording and reproducing apparatus employing a 5-inch magneto-optical (MO) disk, for example, as an optical disk. This recording and reproducing apparatus will hereinafter be referred to simply as a recording and reproducing apparatus according to this embodiment.

Figure 1:
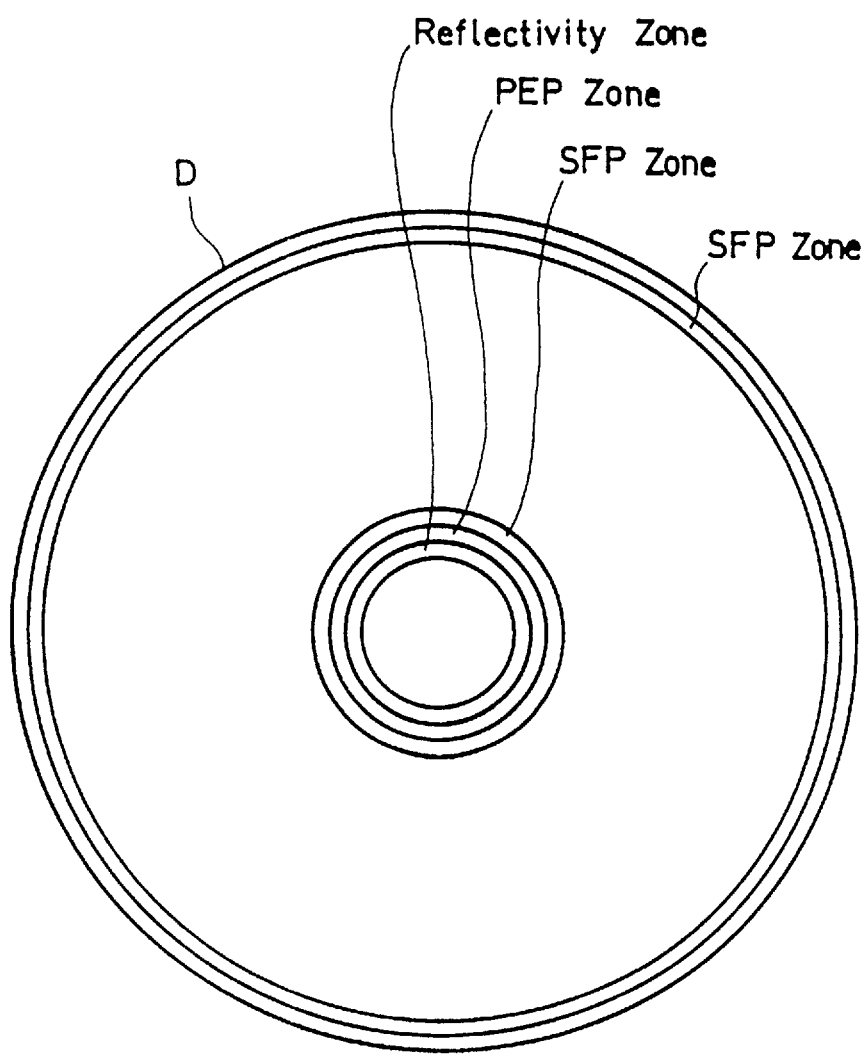
FIG. 1 is a diagram used to explain positions of various zones in a magneto-optical disk.
Figure 2:
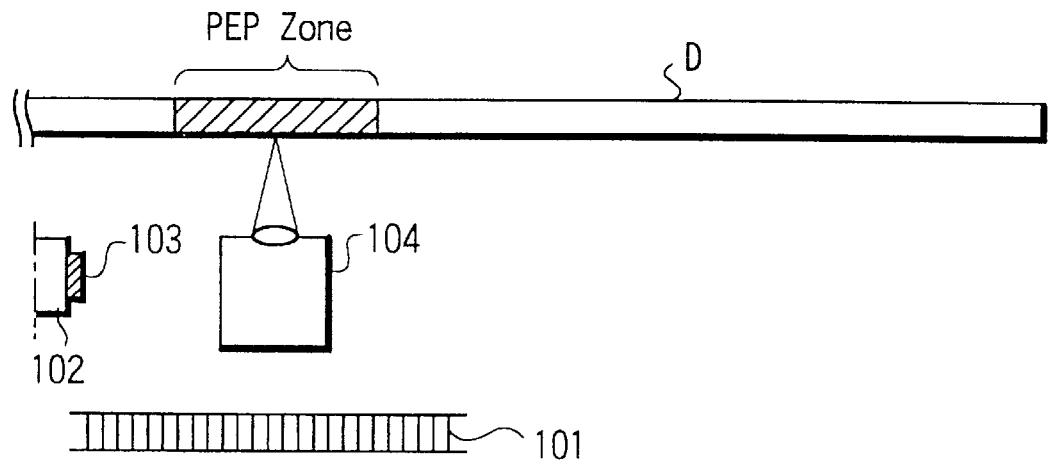
FIG. 2 is a diagram used to explain an arrangement of a related optical disk apparatus.
Figure 3:
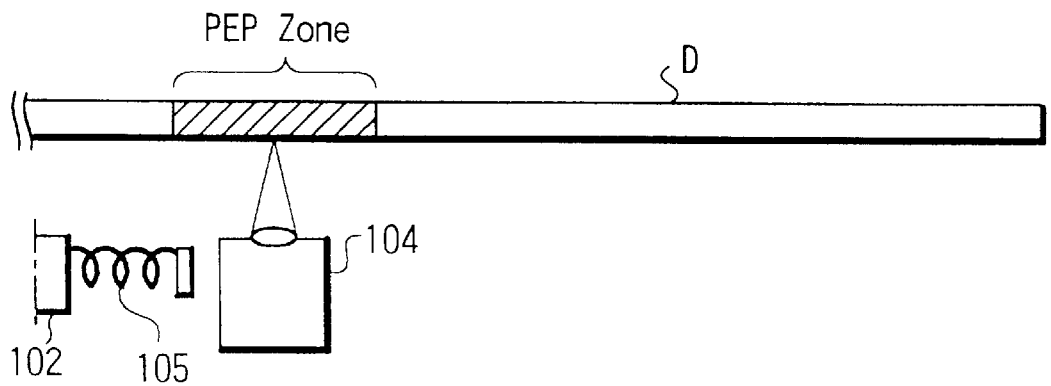
FIG. 3 is a diagram used to explain another arrangement of a related optical disk apparatus.
Figure 4:
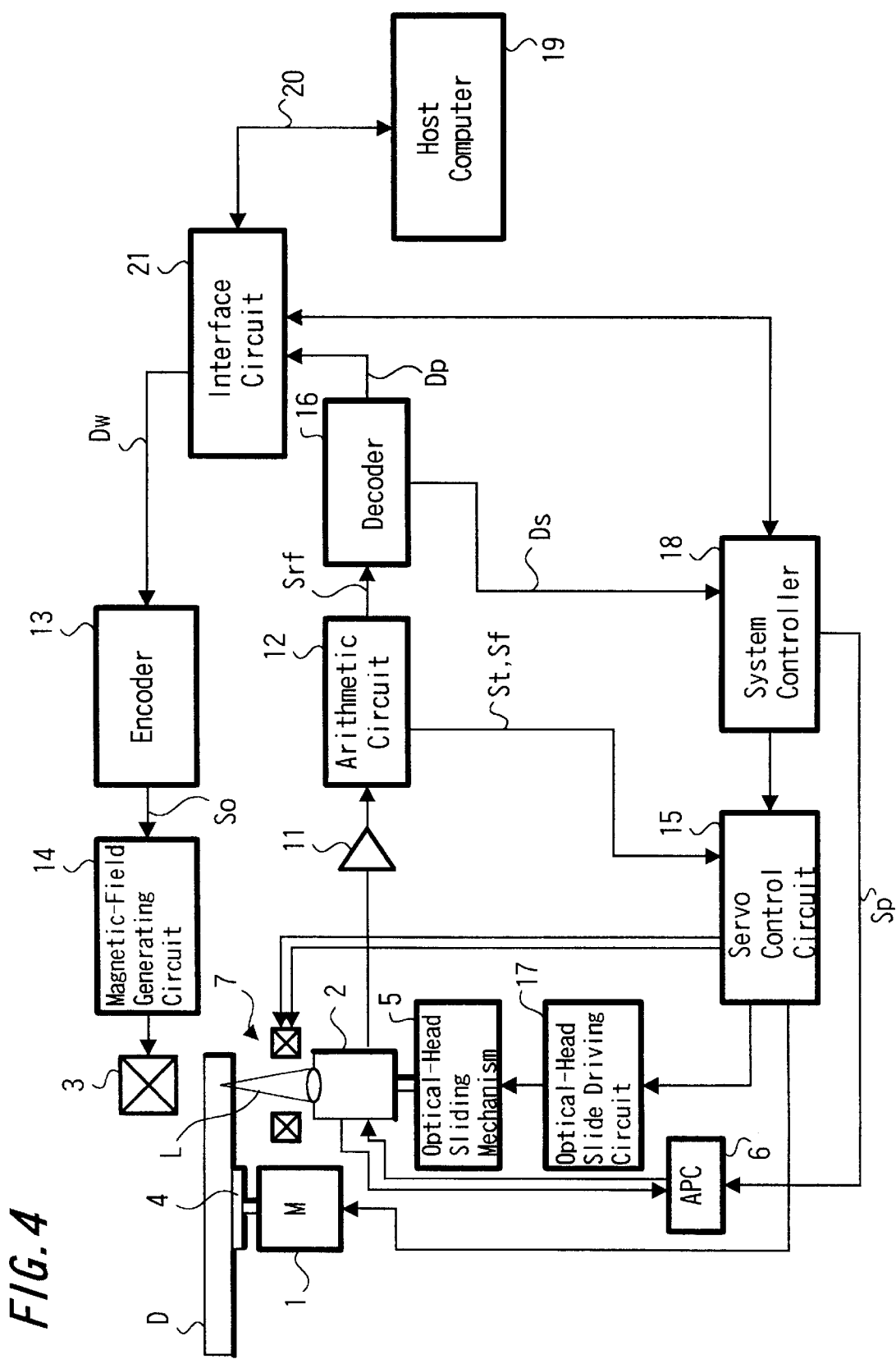
FIG. 4 is a diagram showing an arrangement of a magnetic-field modulation type recording and reproducing apparatus using a 5-inch magneto-optical (MO) disk as an optical disk according to an embodiment to which a disk apparatus according to the present invention is applied (hereinafter referred to as a recording and reproducing apparatus according to the embodiment)

The recording and reproducing apparatus according to this embodiment is formed of a disk recording and reproducing apparatus employing a magneto-optical disk as a recording medium. As shown in FIG. 4, the recording and reproducing apparatus has a cartridge holder (not shown) into which a disk cartridge (not shown) rotatably housing an optical disk D corresponding to, for example, a magnetic-field modulation system is inserted, a spindle motor 1 for rotating the magneto-optical disk D inserted into the cartridge holder, an optical head 2 for reproducing an information signal from the magneto-optical disk D, and a recording magnetic-field generating device 3 (incorporating an excitation coil) for applying a recording magnetic field to the magneto-optical disk D rotated by the spindle motor 1 and for magnetizing a portion (heated to a temperature exceeding a Curie temperature), which is being applied with rays of laser light L from the optical head 2, of a vertical magnetizing film (recording layer) of the magneto-optical disk D in response to a recording signal. The disk cartridge is not shown in FIG. 4 in order to avoid complicated contents of FIG. 4.

The cartridge holder has therein a known shutter opening and closing mechanism (now shown) for opening and closing a shutter (not shown) of the disk cartridge.

Therefore, when the disk cartridge is inserted into the cartridge holder, the shutter thereof is opened by the shutter opening and closing mechanism. At a position where the shutter is fully opened, i.e., the disk cartridge is completely inserted into the cartridge holder, an operation of loading the disk cartridge onto the recording and reproducing apparatus is finished.

The spindle motor 1 is provided at a lower position corresponding to a center portion of the loaded disk cartridge, and can be moved by a known spindle motor upward/downward moving mechanism (not shown) mainly formed of a stepping motor and a rotation-linear movement converting mechanism, for example, upward and downward, i.e., in the direction in which the spindle motor is brought close to and away from the disk cartridge. A turntable 4 is provided at an upper end edge of a motor shaft of the spindle motor 1.

When the disk cartridge is loaded onto the recording and reproducing apparatus, the spindle motor 1 is moved upward by the spindle motor upward/downward moving mechanism. During the above movement of the spindle motor 1, the turntable 4 is brought into the disk cartridge through a rear side opening portion of the disk cartridge. At this time, magnetic attraction of a magnet tightly bonds an upper surface of the turntable 4 and a center hub of the magneto-optical disk D in the disk cartridge together and holds them, thereby the magneto-optical disk D in the disk cartridge being loaded onto the spindle motor 1.

The optical head 2 is provided at a position below the rear side opening portion of the disk cartridge exposed to inside the recording and reproducing apparatus. The optical head 2 can be moved in the radius direction of the magneto-optical disk D in the disk cartridge by an optical head sliding mechanism 5 mainly formed of a voice coil motor and a guide shaft. The optical head sliding mechanism 5 and its drive control system will be described later on.

The optical head 2 is formed as one unit which is the whole optical system having a laser light source formed of a semiconductor laser serving as a light source for light beams L, an objective lens for condensing the light beams L on the magneto-optical disk D, a photo detector for detecting returning light reflected by a surface of the magneto-optical disk D to convert the returning light into an electric signal (detection signal) having a current level corresponding to its light amount.

The optical system has, other than the above optical parts, a collimator lens for setting the light beams L emitted from the laser light source in parallel, a phase grating for dividing the light beams L into at least three luminous-flux components, a beam splitter for separating the light beams L from the laser light source and the returning light from the magneto-optical disk D, and so on.

The optical system has, in an optical path of the returning light, an imaging lens for converging the returning light on the photosensor and a multi-lens formed of a cylindrical lens and a concave lens for adjusting a focal length of the returning light and producing astigmatism.

The optical system has a photodetector used for monitoring which is provided on the opposite side of the imaging lens side of tho beam splitter and which detects a part (an optical component reflected by a boundary surface of the beam splitter) of the light beams L (P polarization in this embodiment) from the laser light source to convert the detected light beam L into an electric signal (detection signal) having an output level (electrical level) corresponding to a light amount of the optical component.

In this embodiment, characteristics of the beam splitter are set so that a transmittance of P polarization and a reflectivity of S polarization should be respectively set to TP=80% and RS=100%. As a result, 20% of the light beam L incident from the laser light source on the beam splitter are reflected by the boundary surface thereof and made incident on the photodetector used for monitoring.

A light amount control circuit (generally called an automatic power control (APC) circuit) 6 for outputting a control signal to the laser light source based on the detection signal from the photodetector used for the monitoring so that the laser light source should oscillate stably is connected to the succeeding stage of the photodetector used for the monitoring.

Specifically, the APC circuit 6 outputs a control signal Sp to the laser light source of the optical head 2 so that an output (light amount) of the light beam L emitted from the laser light source should have a value indicated by a set value data supplied from a system controller 18 described later on and so that the laser light source should stably oscillate. The values indicated by the set value data supplied from the system controller 18 when an information signal is reproduced from the magneto-optical disk D and when an information signal is recorded thereon are different from each other. The values are set so that the output of the light beam used upon the recording of the information signal should be larger than that used upon the reproduction thereof.

The objective lens of the optical head 2 is slightly moved by a two-dimensional actuator 7 in the direction in which the objective lens is brought close to and away from the magneto-optical disk D and in the radius direction thereof. The two-dimensional actuator 7 is formed of a magnetic circuit formed of, for example, a focus coil, a tracking coil and a magnet.

The objective lens has a posture control mechanism (midpoint servo mechanism), not shown, for moving the objective lens to a predetermined center position while the laser beam L traces a portion which is not subjected to the tracking servo. The posture control mechanism has a fluctuation detecting circuit for outputting a signal having a waveform corresponding the fluctuation amplitude when the objective lens is fluctuated in the left and right directions, and a servo circuit for making an excitation current flowing through the tracking coil so that the signal waveform from the fluctuation detecting circuit should have a constant level (e.g., a level 0).

The recording magnetic-field generating device 3 is provided at a position above an upper side opening portion, exposed to the inside of the recording and reproducing apparatus, of the disk cartridge. The recording magnetic-field generating device 3 can be freely moved by a known upward/downward moving mechanism (not shown) mainly formed of a stepping motor and a rotation-linear movement converting mechanism in the upward and downward directions, i.e., in the direction in which the recording magnetic-field generating device 3 is brought close to and away from the upper side opening portion of the disk cartridge. The recording magnetic-field generating device 3 is moved in the radius direction of the magneto-optical disk D by an interlocking mechanism (not shown) with being linked with the optical head 2.

As shown in FIG. 4, other than the above APC circuit 6, a circuit system of the recording and reproducing apparatus according to the embodiment has an RF amplifier 11, an arithmetic circuit 12, an encoder 13, a magnetic-field generating circuit 14, a servo control circuit 15, a decoder 16, an optical-head slide driving circuit 17 and the system controller 18 for controlling these circuits. The system controller 18 is connected to a host computer 19 externally provided so that data should be transferred through an interface bus 20 (e.g., small computer system interface (SCSI) bus) and an interface circuit 21 between the recording and reproducing apparatus and the host computer 19.

The interface circuit 21 interprets contents of a command supplied from the host computer 19 or the like connected to this recording and reproducing apparatus and transfers the contents of the operation command to the system controller 18. The interface circuit 21 also functions as a buffer for transmitting and receiving data to and from the host computer 19. In this case, the interface circuit 21 carries out error correction (with error correction codes (ECC)) for disk defects.

The RF amplifier 11 converts a light detection signal (current signal) from the photosensor of the optical head 2 into a voltage signal to amplify the voltage signal with a predetermined gain. The arithmetic circuit 12 generates various signals, i.e., a tracking error signal St, a focus error signal Sf and an RF signal Srf based on the light detection signal (voltage signal) from the RF amplifier 11.

The encoder 13 subjects a recording data Dw supplied from tho host computer 19 through the interface circuit 21 to an encoding processing with an error correction and an eight-to-fourteen modulation (EFM) to thereby convert the recording data Dw into recording information data. Further, the encoder 13 converts the recording information data into binary data to thereby output the recording data Dw-as an on/off signal So to the magnetic field generating circuit 14.

The magnetic-field generating circuit 14 switches a direction of a current supply to the excitation coil of the recording magnetic-field generating device 3 to a positive direction or a negative direction based on the on/off signal So from the encoder 13.

Specifically, when the current flows through the excitation coil in the positive direction, the portion heated over the Curie temperature by irradiation of the laser light from optical head 2 is magnetized in the positive direction, for example, and when the current flows through the excitation coil in the negative direction, the portion is magnetized in the negative direction.

Then, the optical head 2 irradiates rays of a reproduction laser light L on the magneto-optical disk D. A photosensor formed of a pn junction photodiode, for example, incorporated in the optical head 2 detects a Kerr rotation angle included in a luminous flux of the reflected light modulated at the portion magnetized in the positive direction or the portion magnetized in the negative direction. Thus, the recording and reproducing apparatus can obtain a reproduced signal recorded on the magneto-optical disk D in the form of a magnetization information.

The servo control circuit 15 incorporates a focus servo circuit, a tracking servo circuit, a spindle servo circuit, a sled servo circuit, a motor servo circuit for effecting servo control on a motor which is a drive source of various moving mechanisms, and so on. These servo circuits are inputted with a servo drive and control signal such as servo control data (e.g., a servo gain and so on) from the system controller 18, a drive signal or the like, and a servo calculation signal from the arithmetic circuit 12.

The spindle servo circuit drives the spindle motor 1 based on the servo drive and control signal from the system controller 18, and rotates the magneto-optical disk D loaded on the turntable 4 in a constant angular velocity (CAV) system or a constant linear-velocity (CLV) system. If the magneto-optical disk D is a disk of a sample servo system, the servo drive and control signal is generated based on a clock signal obtained by multiplying (dividing) a frequency of a pulse signal resulting from detection of a clock pit formed on a servo region together with a servo pit or from detection of the servo pit by a PLL circuit, for example.

The above focus servo circuit drives and controls the two-dimensional actuator 7 of the optical head 2 based on a focus error signal Sf from the arithmetic circuit 12, i.e., specifically based on a signal obtained when the arithmetic circuit 12 subjects to a predetermined calculation a detection signal resulting from irradiation of the laser light on a mirror surface formed on the magneto-optical disk D and corresponding to a reflected light amount. Thus, the focus servo circuit moves the objective lens in the direction in which the objective lens is brought close to and away from the magneto-optical disk D to thereby adjust a focal point.

The above tracking servo circuit drives and controls the two-dimensional actuator 7 of the optical head based on a focus error signal Sf from the arithmetic circuit 12, i.e., specifically based on a signal obtained when the arithmetic circuit 12 subjects to a predetermined calculation a detection signal resulting from detection of a servo pit in the servo region formed on the magneto-optical disk D. Thus, the focus servo circuit moves the objective lens in the radius direction of the magneto-optical disk D to thereby adjust the tracking.

While comparing a reference value data successively supplied from the system controller 18 and a data indicative of a present position of the optical head 2 (a positional data obtained from the linear encoder), the sled servo circuit outputs a control signal to the optical-head slide driving circuit 17 so that the optical head 2 should reach a position indicated by the reference position data. The optical-head slide driving circuit 17 drives and controls the voice coil motor serving as a drive source of the optical-head sliding mechanism 5 in response to a level (a current level, a voltage level, a frequency or the like) of the control signal from the sled servo circuit.

The decoder 16 converts into a digital data the reproduced signal Srf from the arithmetic circuit 12, i.e., specifically a signal obtained by subjecting to a predetermined signal a P polarization component and an S polarization component of the reflected light modulated in response to magnetized information recorded in a recording layer of the magneto-optical disk D, and further decodes the digital data with using an error correction code added with the converted digital data to output the decoded digital data as a reproduced data Dp. The reproduced data Dp from the decoder 16 is supplied through the interface circuit 21 and the interface bus 20 to the host computer 19, for example, externally connected to the recording and the reproducing apparatus. Of the reproduced data Dp supplied to the host computer 19, a subcode Ds such as a sector synchronization signal, a sector address signal or the like is supplied to the system controller 18 which uses the subcode Ds to control rotation of the spindle motor 1 and control a scanning position of the optical head 2 upon the seek operation.

Figure 5:
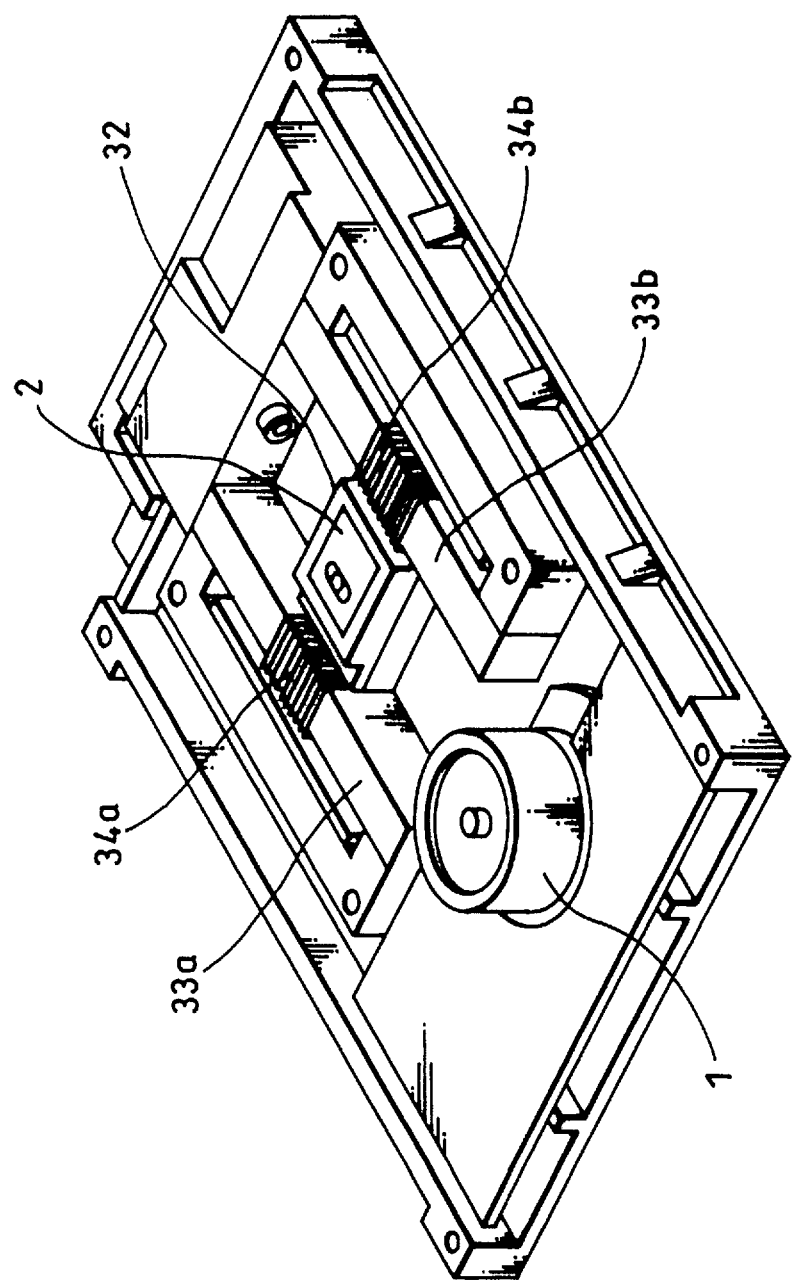
FIG. 5 is an exploded, perspective view showing an internal arrangement of the recording and reproducing apparatus according to the embodiment.
Figure 6:
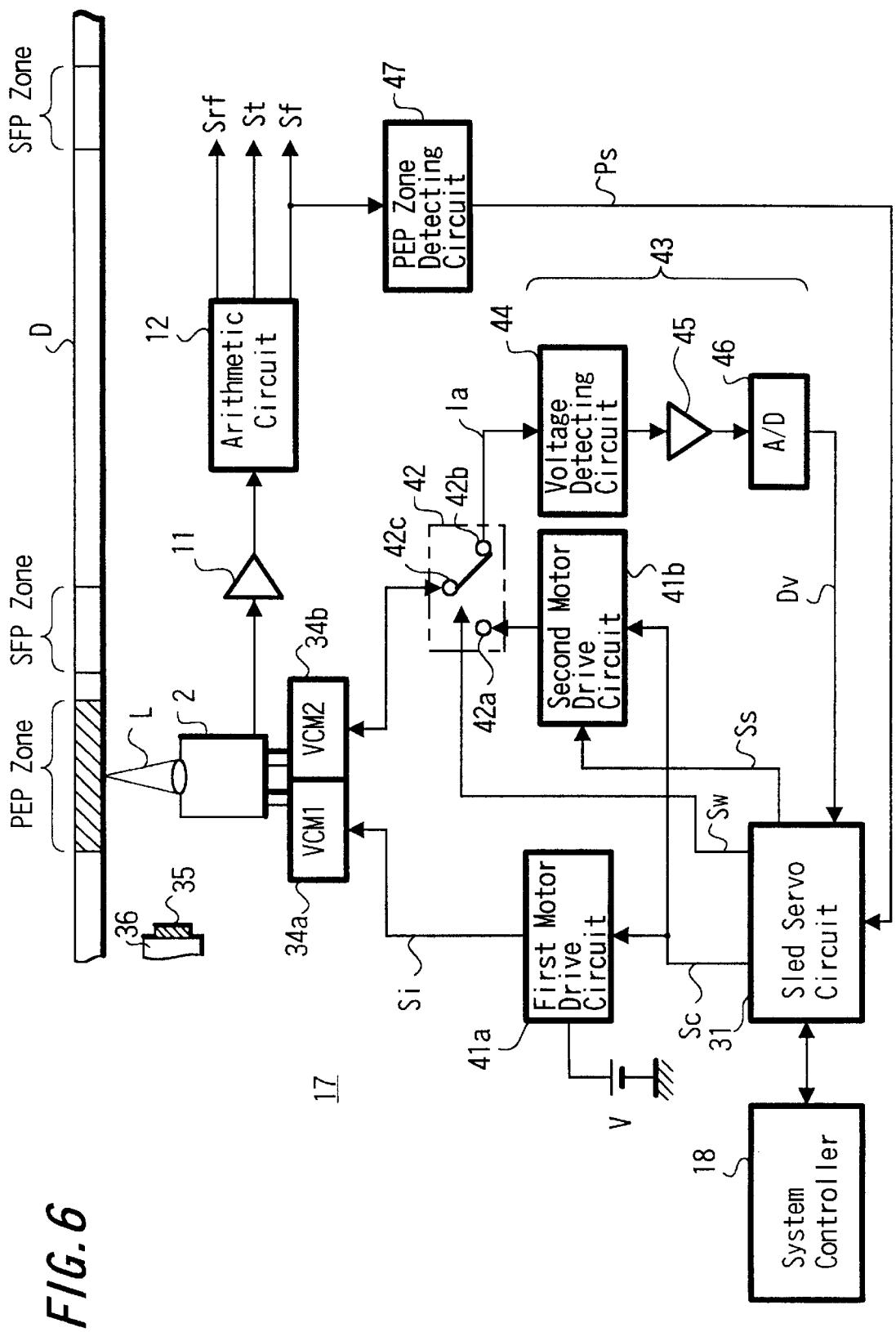
FIG. 6 is a diagram showing an arrangement of an optical-head slide drive circuit incorporated in the recording and reproducing apparatus according to this embodiment.
Figure 7:
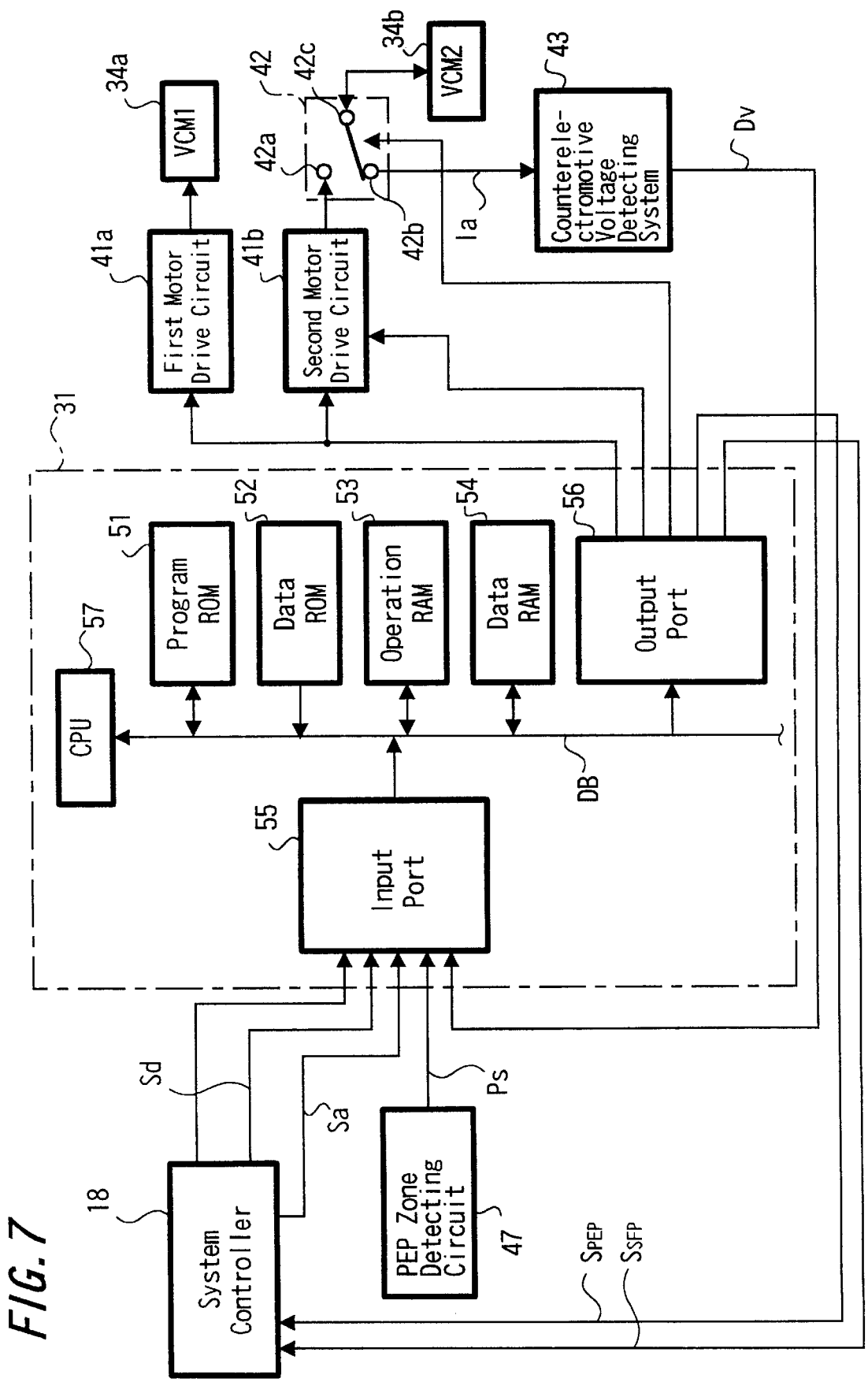
FIG. 7 is a block diagram showing an arrangement of a sled servo circuit incorporated in a servo control circuit shown in FIG. 4.

As shown in FIGS. 5 through 7 which shows main parts of the recording and reproducing apparatus according to this embodiment, the optical-head sliding mechanism 5, the optical-head slide driving circuit 17 and the sled servo circuit 31 are arranged as follows.

Specifically, as shown in FIG. 5, the optical-head sliding mechanism 5 has two guide shafts 33a, 33b for guiding a casing (hereinafter referred to as a carriage 32) housing the optical head formed as a unit in the radius direction of the magneto-optical disk D, and two voice coil motors (first and second voice coil motors 34a, 34b) serving as a drive source for moving the carriage 32 in the radius direction of the magneto-optical disk D. As shown in FIG. 5, the first and second voice coil motors 34a, 34b are respectively formed as short coil type voice coil motors.

As shown in FIG. 6, the optical-head slide driving circuit 17 has two drive circuits (first and second motor drive circuits 41a, 41b) for supplying drive currents Si to the first and second voice coil motors 34a, 34b based on the control signal Sc input from the sled servo circuit 31. The motor drive circuits 41a, 41b supply the drive currents Si responding to the level of the control signal Sc supplied from the sled servo circuit 31 to the respective voice coil motors 34a, 34b so that the optical head 2 should move toward the inner periphery or outer periphery of the magneto-optical disk D in response to a polarity of the control signal Sc.

For example, when the positive-direction drive current Si flows through drive coils of the first and second voice coil motors 34a, 34b, the carriage 32 is moved toward the inner periphery side of the magneto-optical disk D along the guide shafts 33a, 33b. On the other hand, when the negative-direction drive current Si flows therethrough, the carriage 32 is moved toward the outer periphery side of the magneto-optical disk D along the guide shafts 33a, 33b.

Especially, the recording and reproducing apparatus has a stopper 35 for forcibly stopping movement of the optical head 2 when the optical head 2 is moved toward the inner periphery side of the magneto-optical disk D and then reaches a position corresponding to the innermost periphery of the magneto-optical disk D. The stopper 35 is formed of, for example, synthetic resin, a rubber or the like and bonded by an adhesive or the like to a metal plate piece 36 provided in the spindle motor 1 or a chassis or the like of the recording and reproducing apparatus.

A switching circuit 42 is connected between the second motor driving circuit 41b and the second voice coil motor 34b. A counterelectromotive voltage detecting system 43 for detecting a counterelectromotive current Ia produced in the second voice coil motor 34b as a voltage signal Sv is connected between the switching circuit 42 and the sled servo circuit 31. The counterelectromotive voltage detecting system 43 has a voltage detecting circuit 44 for detecting the counterelectromotive current Ia produced in the second voice coil motor 34b to convert the detected current Ia into the voltage signal Sc corresponding to the level of the detected current Ia, an amplifier 45 for amplifying the voltage signal Sv from the voltage detecting circuit 44 with a predetermined gain, and an A/D converter 46 for converting the amplified voltage signal Sv from the amplifier 45 into a digital voltage data Dv to supply the digital voltage data Dv to the sled servo circuit 31.

The switching circuit 42 has a first fixed contact 42a connected to the output side of the second motor drive circuit 41b, a second fixed contact 42b connected to the input side of the voltage detecting circuit 44 and a movable contact 42c connected to a side of the second voice coil motor 34b. The movable contact 42c is switched in response to a level of a switching control signal Sw output from the sled servo circuit 31.

Specifically, when the switching control signal Sw is at a low level, the movable contact 42c is electrically connected to the first fixed contact 42a, thereby the drive current Si from the second motor drive circuit 41b being supplied to the second voice coil motor 34b. When the switching control signal Sw is at a high level, the movable contact 42c is electrically connected to the second fixed contact 42b, thereby the drive current Si from the second motor drive circuit 41b being prevented from being supplied to the second voice coil motor 34b. Specifically, when the movable contact 42c is switched to the second fixed contact 42b side, the second voice coil motor 34b is brought in its drive stop state.

The above first and second motor drive circuits 41a, 41b respectively have enable terminals. The enable terminal of the first motor drive circuit 41a is applied with a certain voltage V which constantly sets the first motor drive circuit 41 in its operable state. On the other hand, the enable terminal of the second motor drive circuit 41b is supplied with an operation selection signal Ss from the sled servo circuit 31. When the operation selection signal Ss supplied to the enable terminal of the second motor drive circuit 41b is at a high level, the second motor drive circuit 41b is brought in its operable state (in which it accepts the control signal Sc from the sled servo circuit 31), and when the operation selection signal Ss is at a low level, it is brought in its non-operable state (in which it does not accepts the control signal Ss from the sled servo circuit 31).

Since the first motor drive circuit 41a drives the first voice coil motor 34a when the second voice coil motor 34b remains in its stop state, when the carriage 32 is moved in the radius direction of the magneto-optical disk D, the drive coil of the second voice coil motor 34b traverses a magnetic flux produced by the magnet of the second voice coil motor 34b, thereby the counterelectromotive current Ia flowing through the drive coil of the second voice coil motor 34b. The counterelectromotive current Ia is supplied through the switching circuit 42 to the voltage detecting circuit 44 of the counterelectromotive voltage detecting system 43 and derived by the voltage detecting circuit 44 as a counterelectromotive voltage (voltage signal Sv).

A voltage level of the counterelectromotive voltage Sv is changed in proportion to a speed at which the drive coil of the second voice coil motor 34b traverses the magnetic flux produced by the magnet thereof, i.e., a movement speed of the carriage 32.

The optical-head slide driving circuit 17 incorporates a PEP zone detecting circuit 47 for detecting that the optical head 2 reaches the PEP zone where the attribute information, especially the phase information of the magneto-optical disk D is recorded.

The phase information is recorded on the PEP zone in the form of codes such as a bar code, for example, or the like by providing a large number of pits extended in the radius direction (hereinafter referred to as longitudinal pits for convenience) in the PEP zone along a circumference direction.

A detection principle of the PEP zone detecting circuit 47 is as follows. The magneto-optical disk D has a mirror surface on the inner side of the PEP zone. The large number of longitudinal pits are provided in the PEP zone along the circumference direction of the magneto-optical disk D.

Therefore, study of a signal waveform of the focus error signal Sf from the optical head 2 obtained when the optical head 2 positioned at the innermost periphery side of the magneto-optical disk D is moved toward the outer periphery thereof, reveals that the signal level of the focus error signal Sf is kept at a constant level while the rays of the laser light L are being irradiated on the inner periphery mirror surface and that, on the other hand, the signal level is changed to a high level (or a low level) every time when the rays of the laser light L traverses one of the above longitudinal pits after entering the PEP zone.

Accordingly, a circuit such as a monostable multivibrator, for example, or the like for outputting a pulse signal Ps having a pulse width determined by a time constant of the circuit based on an input timing of a first trigger signal can be employed as the PEP zone detecting circuit 47. In this case, if the focus error signal from the optical head 2 (or the focus error signal Sf from the arithmetic circuit 12) is employed as the first trigger signal, then the PEP zone detecting circuit 47 outputs the pulse signal Ps having a constant pulse width after the rays of the laser light L enters the PEP zone and hence the signal level of the focus error signal is changed. As a result, it can be determined that a time when the pulse signal Ps is output is just a time when the PEP zone is detected.

The above sled servo circuit 31 is formed of a microcomputer, for example. The sled servo circuit 31 has as a software an access pre-processing means for reading the attribute data of the magneto-optical disk D from the PEP zone, the SFP zone and so on-thereof, and an access control processing means for accessing the information signal recorded on the magneto-optical disk D through the optical head 2.

While comparing the reference value data successively supplied from the system controller 18 and the data indicative of a present position of the optical head 2 (a positional data obtained from the linear encoder), the access control processing means outputs a control signal Sc to the optical-head slide driving circuit 17 so that the optical head 2 should reach a position indicated by the reference position data. This processing has been generally known and hence need not to be described in detail. A processing of the access pre-processing means will mainly be described below.

As shown in FIG. 7, the sled servo circuit 31 has as a hardware a program ROM 51 for storing various programs such as the above access pre-processing means or the like, a data ROM 52 in which various fixed data are previously registered, an operation RAM 53 used for an operation of the program read out from the above program ROM 51, a data RAM 54 for storing data and the control signals from the system controller 18, data processed in various programs or the like, an input port 55 and an output port 56 for respectively inputting and outputting data from and to an external circuit, and a CPU (control device and a logical arithmetic device) 57 for controlling the above various circuits.

The above various circuits transmit and receive data through a data bus DB among one another. Moreover, the above various circuits are controlled by the CPU 57 through an address bus and a control bus (both of which are not shown) derived from the CPU 57.

The system controller 18 outputs the reference value data to the sled servo circuit 31 and further outputs a start signal Sd used for reading the attribute information thereto based on an input interruption signal issued based on the fact the magneto-optical disk D is loaded on the recording and reproducing apparatus.

A processing of the access pre-processing means of the sled servo circuit 31 will be described with reference to FIG. 8 which is a functional block diagram thereof and FIG. 9 which is a flowchart therefor.

Figure 9:
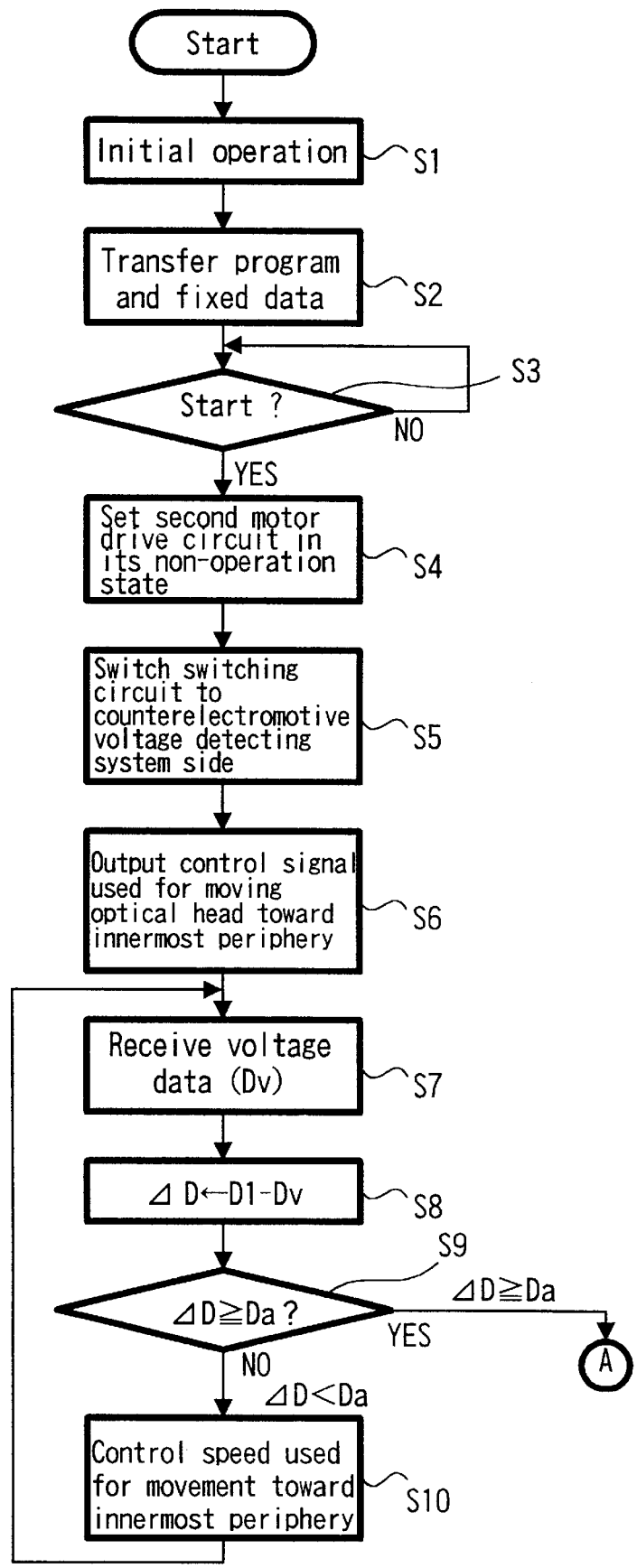
FIG. 9 is a flowchart showing a processing of the access pre-processing means incorporated in the sled servo circuit.
Figure 10:
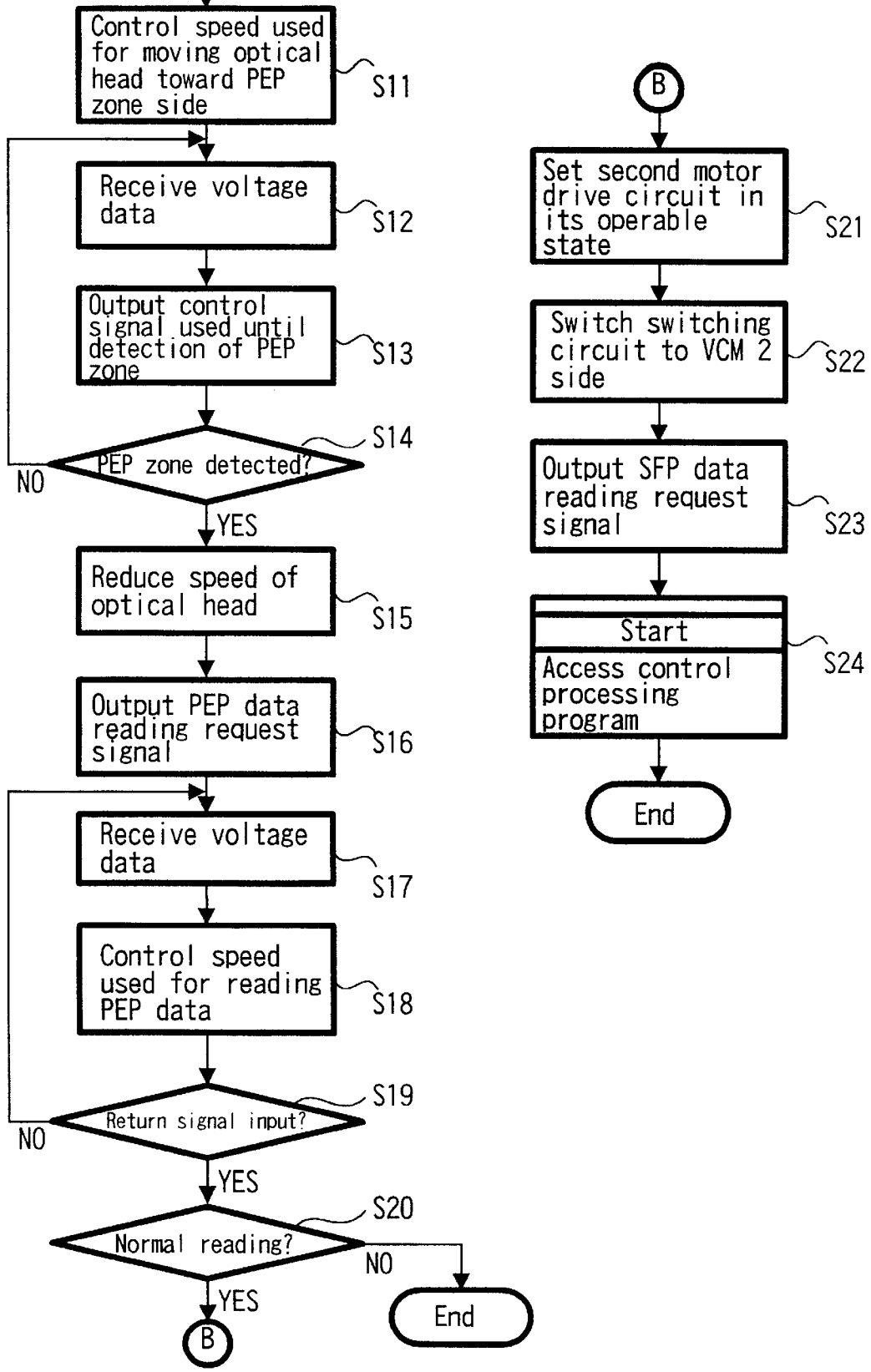
FIG. 10 is a flowchart showing the processing of the access pre-processing means incorporated in the sled servo circuit.

In step S1 of the flowchart shown in FIG. 9, simultaneously with energizing the recording and reproducing apparatus, the sled servo circuit 31 carries out its initial operation such as, for example, a system check of the microcomputer, a memory check thereof, a setup therefor or the like. The processing proceeds to step S2.

In step S2, an access pre-processing means 61 (which is an access pre-processing program: see FIG. 8) is read out from the program ROM 51 and stored in the operation RAM 53. At the same time, a work area used for temporarily storing data generated during operation of this access pre-processing program and for transmitting and receiving parameters between routines forming the access pre-processing program is allocated in the operation RAM 53.

A fixed data storage area for storing various fixed data from the data ROM 52 is allocated in the data RAM 54. The fixed data storage area has a first target value storage area for storing data (a first target value D1) concerning a target speed when the optical head 2 is moved from the outermost periphery of the magneto-optical disk D to the innermost periphery thereof, a set value storage area for storing a set value Da used to determine whether or not the optical head 2 reaches the position corresponding to the innermost periphery, a second target value storage area for storing data (second target value D2) concerning a target speed used until the PEP zone is detected, and a third target value storage area for storing data (third target value D3) concerning a target speed when the PEP data is read out from the PEP zone.

In step S2, other than the above program transfer processing, the CPU 57 of the sled servo circuit 31 reads out the above various fixed data from the data ROM 52 to store them in the fixed data storage area.

Figure 8:
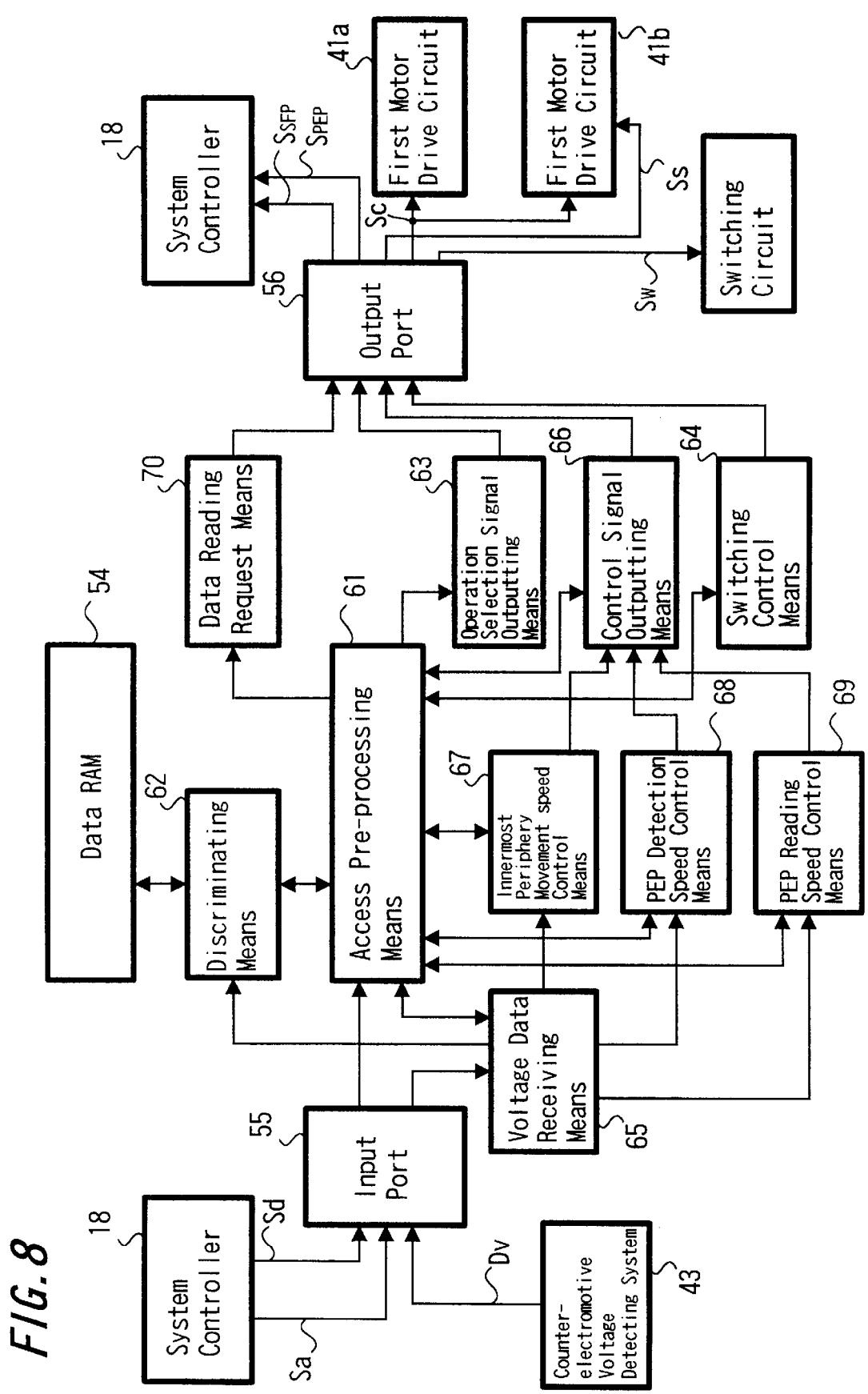
FIG. 8 is a diagram showing functional blocks of an access pre-processing means incorporated in the sled servo circuit.

As shown in FIG. 8, the access pre-processing program 61 read out in the operation RAM 53 has a discriminating means 62 for carrying out various discriminations, an operation selection signal outputting means 63 for outputting an operation selection signal Ss through the output port 56 to the second motor drive circuit 41b, a switching control means 64 for outputting a switching control signal sw used for switching the movable contract 42c of the switching circuit 42 to the second motor drive circuit 41b side or the counterelectromotive detecting system 43 side, a voltage data receiving means 65 for receiving the voltage data Dv input through the input port 55 from the counterelectromotive detecting system 43, a control signal outputting means 66 for respectively outputting the control signal Sc used for driving the first and second voice coil motors 34a, 34b through the output port 56 to the first and second motor driving circuits 41a, 41b, an innermost periphery movement speed control means 67 for carrying a speed control so that the optical head 2 should be moved to ward the innermost periphery side at a predetermined speed, a PEP detecting speed control means 68 for controlling the optical head 2 to be moved at a predetermined speed until detection of the PEP zone, a PEP reading speed control means 69 for controlling the optical head 2 to be moved at a predetermined speed while the optical head 2 reads the PEP data, and a data reading request means 70 for requesting the system controller 18 to read the PEP data and the SFP data.

The processing proceeds to step S3. In step S3 shown in FIG. 9, the access pre-processing program 61 discriminates through the discriminating means 62 whether or not the start signal Sd is input from the system controller 18. This discrimination is repeatedly carried out until the start signal Sd is input therefrom. Specifically, the access pre-processing program 61 is brought in its standby state until the start signal Sd is input.

When the magneto-optical disk D is loaded onto the recording and reproducing apparatus and the start signal Sd is input to the sled servo circuit 31 from the system controller 18, the processing proceeds to step S4, wherein the operation selection signal outputting means 63 of the access pre-processing program 61 outputs the low-level operation selection signal Ss indicative of a non-operation state through the output port 56 to the second motor drive circuit 41b. The second motor drive circuit 41b prohibits its reception of the control signal Sc output from the sled servo circuit 31 based on the input low-level operation selection signal Ss from the sled servo circuit 31. Thus, supply of the drive current Si to the second voice coil motor 34b is stopped.

The processing proceeds to step S5, wherein the switching control means 64 outputs the high-level switching control signal sw through the output port 56 to the switching circuit 42. The switching circuit 42 switches its movable contract 42c to the counterelectromotive voltage detecting system 43 side, i.e., the fixed contact 42b side based on the input high-level switching control signal sw output from the sled servo circuit 31.

The processing proceeds to step S6, wherein the control signal outputting means 66 outputs the control signal Sc used for driving the first voice coil motor 34a (to move the optical head 2 toward the innermost periphery of the magneto-optical disk D) through the output port 56 to the first motor drive circuit 41a. The first motor drive circuit 41a starts to supply the drive current Si to the first voice coil motor 34a based on the control signal Sc input from the sled servo circuit 31, thereby the optical head 2 starting to move toward the innermost periphery. At this time, the counterelectromotive current Ia having a level corresponding a speed of the optical head 2 flows through the second voice coil motor 34b, flowing through the switching circuit 42 to the counterelectromotive voltage detecting system 43. The counterelectromotive voltage detecting system 43 converts the supplied counterelectromotive current Ia into the voltage signal Sv and further converts the voltage signal Sv into the digital data (voltage data Dv) to output the digital data.

The processing proceeds to step S7, wherein the voltage data receiving means 65 receives the voltage data Dv supplied from the counterelectromotive voltage detecting system 43 through the input port 55, stores the received voltage data Dv in a voltage data storage register Ra (a register declared as a voltage data storage register of various registers used by the access pre-processing program 61).

The processing proceeds to step S8, wherein the innermost movement speed control means 67 extracts the voltage data Dv stored in the voltage data storage register Ra from the first target value D1 concerning the target speed used when the optical head 2 is moved from the outermost periphery of the magneto-optical disk D to the innermost periphery thereof, thereby obtaining a changed amount ΔD of the speed.

The processing proceeds to step S9, wherein the discriminating means 62 discriminates whether or not the optical head 2 has reached the position corresponding to the innermost periphery of the magneto-optical disk D. This discrimination is carried out by determining whether or not the above changed amount ΔD exceeds the set value Da stored in the set value storage area. If the changed amount ΔD is smaller than the set value Da, then it is determined that the optical head 2 has not reached the position corresponding to the innermost periphery of the magneto-optical disk D. Then, the processing proceeds to step S10.

In step S10, the innermost periphery movement speed control means 67 compares the first target value D1 and the voltage data Dv. If the value of the voltage data Dv is larger than the-first target value D1, then the control signal outputting means 66 lowers the level of the control signal Sc supplied to the first motor drive circuit 41a, thereby the movement speed of the optical head 2 being reduced. If on the other hand the value of the voltage data Dv is smaller than the first target value D1, then the control signal outputting means 66 increases the level of the control signal Sc supplied to the first motor drive circuit 41a, thereby the movement speed of the optical head 2 being increased.

Then, the processing returns to step S7, and thereafter the processings in step S7 and the succeeding steps are carried out repeatedly. The processings from step S7 to step S10 are repeatedly carried out until it is determined in step S9 that the optical head 2 has reached the position corresponding to the innermost periphery. Though these processings, the optical head 2 is moved toward the innermost periphery of the magneto-optical disk D at a predetermined speed indicated by the first target value D1, and finally reaches the position corresponding to the innermost periphery.

When the optical head 2 reaches the position corresponding to the innermost periphery, the optical head 2 is brought in contact with the stopper 35 and hence forcibly stopped. At this time, the fluctuation detecting circuit of the midpoint servo mechanism included in the optical head 2 outputs a signal having a waveform with a high peak value.

Therefore, if not only comparison of the changed amount between the first target value D1 nd the voltage data Dv and the set value but also a processing of discriminating whether or not an amplitude of the signal output from the fluctuation detecting circuit of the midpoint servo mechanism of the optical head 2 has a certain signal level or higher is employed in the discrimination processing in step S9, then it is possible to precisely determine that the optical head 2 reaches the position corresponding to the innermost periphery of the magneto-optical disk D.

The processing proceeds to step S11 (FIG. 10), wherein the control signal outputting means 66 outputs the control signal Sc used for driving the first voice coil motor 34a (to move the optical head 2 toward the PEP zone) through the output port 56 to the fist motor drive circuit 41a. As a result, the optical head 2 starts moving toward the PEP zone. At this time, the counterelectromotive current Ia having a level corresponding to the speed of the optical head 2 flows through the second voice coil motor 34b, flowing through the switching circuit 42 to the counterelectromotive voltage detecting system 43. T he counterelectromotive voltage detecting system 43 converts the counterelectromotive current Ia into the voltage signal Sv and further converts the voltage signal Sv into the digital data (voltage data Dv) to output the digital data.

The processing proceeds to step S12, wherein the voltage data receiving means 65 receives the voltage data Dv supplied from the counterelectromotive voltage detecting system 43 through the input port 55 and stores it in the voltage data storage register Ra.

The processing proceeds to step S13, wherein the PEP detecting speed control means 68 compares the second target value D2 which is stored in the second target value storage area and concerns the target speed used until detection of the PEP zone, with the voltage data Dv. If the value of the voltage data Dv is larger than the second target value D2, then the control signal outputting means 66 lowers the level of the control signal Sc supplied to the first motor drive circuit 41a, thereby the movement speed of the optical head 2 being reduced. If on the other hand the value of the voltage data Dv is smaller than the second target value D2, then the control signal outputting means 66 increases the level of the control signal Sc, thereby the movement speed of the optical head 2 being increased.

The processing proceeds to step S14, wherein the discriminating means 62 discriminates whether or not the PEP zone is detected. This discrimination is carried out by determining whether or not the pulse signal Ps from the PEP zone detecting circuit 47 is input therefrom. If it is determined in step S14 that the pulse signal Ps is not inputted, then the processing returns to step S12, and thereafter the processings in step S12 and in the succeeding steps are repeatedly carried out. THrough these repeated processings, the optical head 2 is moved toward the PEP zone at a predetermined speed indicated by the second target value D2 until detection of the PEP zone.

If on the other hand it is determined in step S14 that the PEP zone is detected, then the processing proceeds to step S15, wherein the control signal outputting means 66 lowers the level of the control signal Sc supplied to the first motor drive circuit 41a, thereby the movement speed of the optical head 2 being reduced.

The processing proceeds to step S16, wherein the data reading request means 70 outputs a signal used to request the reading of the data (PEP data reading request signal SPEP) through the output port 56 to the system controller 18.

The system controller 18 receives the information indicative of normal reading or abnormal reading output from the decoder 16 based on the PEP data reading request signal SPEP input from the sled servo circuit 31. If the information received from the decoder 16 indicates that the PEP data is normally read, then the system controller reads the PEP data output from the decoder 16 and stores the PEP data in a memory thereof. Further, the system controller 18 supplies a signal indicative "normal" to the sled servo circuit 31. If on the other hand the information indicates that the data is not normally read, then the operation of reading the PEP data is carried out several times over all the PEP zone. If the PEP data is normally read during the several operations of reading the PEP data, then the above processing is carried out. If on the other hand the PEP data cannot be normally read during the several operations of reading the PEP data, then the system controller 18 controls a display device such as a liquid crystal display or the like connected to the system controller 18 to display a message "this disk has different format" and further supplies a signal indicative of "abnormal" to the sled servo circuit 31.

The processing proceeds to step S17, wherein the voltage receiving means 65 of the sled servo circuit 31 receives the voltage data Dv supplied thereto from the counterelectromotive voltage detecting system 43 through the input port 55 and the sled servo circuit 31 stores the received voltage data Dv in the voltage data storage register.

The processing proceeds to step S18, wherein the PEP reading speed control means 69 compares the third target value D3 stored in the third target value storage area and concerning the target speed used upon the operation of reading the PEP data from the PEP zone with the voltage data Dv. If the value of the voltage data. Dv is larger than the third target value D3, then the control signal outputting means 66 lowers the level of the control signal Sc supplied to the first motor drive circuit 41a, thereby the speed of the optical head 2 being reduced. If on the other hand the value of the voltage data Dv is smaller than the third target value D3, then the control signal outputting means 66 increases the level of the control signal Sc, thereby the speed of the optical head 2 being increased.

The processing proceeds to step S19, wherein the discriminating means 62 discriminates whether or not the signal Sa is input from the system controller 18. If the signal Sa is not input, then the sled servo circuit 31 determines that the PEP data is being read, and hence the processing returns to step S17, Thereafter the processings in step S17 and the succeeding steps are repeatedly carried out. Through the repeated processings, the optical head 2 is moved over the PEP zone at a predetermined speed indicated by the third target value D3 until the system controller 18 reads the PEP data or until the system controller 18 detects that the PEP data could not normally be read.

If on the other hand it is determined in step S19 that the signal Sa is input from the system controller 18, then the processing proceeds to step S20, wherein the discriminating means 62 determines whether the content of the signal Sa indicates "normal" or "abnormal". If the signal Sa indicates "normal", then the processing proceeds to step S21, and if on the other hand the signal Sa indicates "abnormal", then the access pre-processing program is forcibly stopped.

In step S21, the operation selection signal outputting means 63 outputs a high-level operation selection signal Ss indicative of an operable state through the output port 56 to the second motor drive circuit 41b. The second motor drive circuit 41b accepts the control signal Sc output from the sled servo circuit 31 based on the high-level operation selection signal Ss input from the sled servo circuit 31, and outputs the drive current Si corresponding to a polarity and level of the control signal Sc.

The processing proceeds to step S22, wherein the switching control means 64 outputs the low-level switching control signal Sw through the output port 56 to the switching circuit 42. The switching circuit 42 switches its movable contract 42c to the second motor drive circuit 41b side based on the low-level switching control signal Sw input from the sled servo circuit 31. This switching operation allows the drive current Si output from the second motor drive circuit 41b to be supplied to the second voice coil motor 34b. As a result, the optical head 2 is driven by the first and second voice motor coils 34a, 34b to thereby start moving stably.

The processing proceeds to step S23, wherein the data reading request means 70 outputs the signal used to request the reading of the SFP data (SFP data reading request signal SSFP) through the output port 56 to the system controller 18.

Based on the SFP data reading request signal SSFP input from the sled servo circuit 31, the system controller 18 reads the SFP data output from the decoder 16 and stores it in the memory therein. In this case, since the SFP zone has a guide groove for tracking servo or sample pits formed therein, the SFP data is read out from the SFP zone while the tracking servo control is being carried out.

The processing proceeds to step S24, wherein the access pre-processing program 61 of the sled servo circuit 31 starts the access control processing program and then ends its processing. Thereafter, the ordinary access operation is carried out in accordance with the access control processing program.

As described above, according to the recording and reproducing apparatus of this embodiment, of the two voice coil motors 34a, 34b for moving the optical head 2 in the radius direction of the magneto-optical disk D, the second voice coil motor 34b is brought in its stop state. The optical head 2 is moved by using only the first voice coil motor 34a. At this time, the counterelectromotive current Ia flowing through the excitation coil of the second voice coil motor 34b is converted into the voltage signal indicative of the speed information Dv, and the speed information Dv is supplied to the sled servo circuit 31. Therefore, it is possible to control the optical head 2 to move at a constant speed based on the supplied speed information Dv, without providing some special devices such as a speed sensor or the like. Moreover, it becomes unnecessary to provide a position sensor or an elastic (or springy) member used when the PEP zone is detected. This leads to advantage in manufacturing costs and eliminates consideration of durability of the elastic (or springy) member, which can increase reliability of the recording and reproducing apparatus itself.

Since the counterelectromotive current Ia flowing through the excitation coil of the second voice coil motor 34b is converted into the voltage signal and the voltage signal is used as the speed information Dv, it is advantageous when the PEP data which is to be read at an operation start stage of the recording and reproducing apparatus and contains various attributes of the magneto-optical disk D is read.

Specifically, the advantages obtained from this embodiment are as follows.

(1) It is possible to move the optical head 2 at a constant speed (the first target value D1) based on the speed information Dv when the optical head 2 is once moved toward the innermost periphery of the magneto-optical disk D.

(2) It is possible to easily discriminate whether or not the optical head 2 reaches the position corresponding to the innermost periphery, by comparing the difference ΔD between the first target value D1 and the speed information Dv and the predetermined value Da.

(3) When the optical head 2 at the position corresponding to the innermost periphery is moved toward the PEP zone side, it is possible to move the optical head 2 at the speed (the second target value D2) allowing reliable detection of the PEP zone until the PEP zone is detected.

(4) When the optical head 2 reads the PEP data from the detected PEP zone, it is possible to move the optical head 2 at the speed (the third target value) which is most preferable for reading the PEP data.

While in this embodiment the present invention is applied to the reading of the PEP data recorded in the PEP zone located on the inner periphery side of the magneto-optical disk D, the present invention is not limited thereto and can be applied to the reading of the data recording in a portion where the tracking servo control cannot be carried out.

As described above, the disk apparatus according to the embodiment of the present invention includes a rotation means for rotating the disk loaded onto the disk apparatus, a head for accessing the information signal recorded on the disk being rotated, and a head moving means for moving the head in the radius direction of the disk. Further, the head moving means has a plurality of voice coil motors serving as drive sources for the head moving means, the optical head guiding means for guiding the head in the radius direction of the disk, and the drive means for controlling the plurality of voice coil motors. Therefore, it is possible to carry out the attribute information reading operation carried out at the stage preceding to the access to the disk, with low manufacturing costs and high reliability. Moreover, it is possible to read the attribute information at high speed.

Having described a preferred embodiment of the present invention with reference to the accompanying drawings, it is to be understood that the present invention is not limited to the above-mentioned embodiment and that various changes and modifications can be effected therein by one skilled in the art without departing from the spirit or scope of the present invention as defined in the appended claims.

What is claimed is:

1. A disk apparatus comprising:
   a rotating means for rotating a disk;
   a head for accessing said disk; and
   a head moving means for moving said head in the radius direction of said disk,
   wherein said head moving means comprises
   a first voice coil motor as a drive source used when said head is moved;
   a second voice coil motor as a drive source used when said head is moved;
   a head guide means for guiding said head in the radius direction of said disk when said head is moved;
   a drive means for supplying a drive signal to said first voice coil motor and not supplying a drive signal to said second voice coil motor during a first period in which said head is moved to a predetermined position on said disk and for supplying said drive signal to said first voice coil motor and said second voice coil motor during a second period in which said head is moved from said predetermined position on said disk to another position thereon; and
   a counterelectromotive voltage detecting means for detecting a counterelectromotive voltage from said second voice coil motor when said drive signal is not supplied to said second voice coil motor, and
   wherein said drive means drives said first voice coil motor based on an output from said counterelectromotive voltage detecting means so that said head should be moved to said predetermined position on said disk.

2. A disk apparatus according to claim 1, wherein said head moving means comprises a switching means for connecting said second voice coil motor and said drive means during said second period so that said drive signal should be supplied from said drive means to said second voice coil motor and for connecting said second voice coil motor and said counterelectromotive voltage detecting means during said first period so that an output from said second voice coil motor should be supplied to said counterelectromotive voltage detecting means.

3. A disk apparatus according to claim 2, further comprising a storage means for storing a speed information used for reference when said drive signal is supplied to said first voice coil motor to move said head.

4. A disk apparatus according to claim 1, wherein said disk has a tracking disabled area where tracking is not effected and said predetermined position is located in said tracking disabled area.

5. A disk apparatus according to claim 3, wherein a first target speed information used for reference when said head is moved toward an innermost or outermost periphery of said disk is stored in said storage means, and wherein, when an access command to makes said head access to said tracking disabled area is input, said drive means controls said switching means so that said drive signal should be supplied only to said first voice coil motor, and controls said first voice coil motor based on the output from said counterelectromotive voltage detecting means and said first target speed information until said head is moved to said innermost or outermost periphery.

6. A disk apparatus according to claim 5, wherein said disk has a tracking disabled area where tracking is not effected and said predetermined position is located in said tracking disabled area.

7. A disk apparatus according to claim 6, wherein said predetermined position is located in an attribute information recording area where an information about attributes of said disk is recorded.

8. A disk apparatus according to claim 3, further comprising a predetermined position detecting means for detecting that said head accesses said predetermined position, wherein a second target speed information used for reference when said head is moved from said innermost or outermost periphery to said tracking disabled area is stored in said storage means, and wherein, when an access command to make said head access said predetermined position is input thereto, said drive means moves said head to said innermost or outermost periphery to control said switching means so that said drive signal should be output only to said first voice coil motor, and controls said first voice coil motor based on the output from said counterelectromotive voltage detecting means and said second target speed information until said predetermined position is detected by said predetermined position detecting means until said head is moved from said innermost or outermost periphery.

9. A disk apparatus according to claim 8, wherein said disk has a tracking disabled area where tracking is not effected and said predetermined position is located in said tracking disabled area.

10. A disk apparatus according to claim 9, wherein said predetermined position is located in an attribute information recording area where an information about attributes of said disk is recorded, said predetermined position detecting means is an attribute information recording area detecting means.

11. A disk apparatus according to claim 3, further comprising
a predetermined position detecting means for detecting that said head accesses said predetermined position, wherein a third target speed information used for reference when said head accesses said tracking disabled area is stored in said storage means, and wherein, when said predetermined position detecting means detects that said head accesses said predetermined position, said drive means controls said first voice coil motor based on an output from said counterelectromotive voltage detecting means and said third target speed information.

12. A disk apparatus according to claim 11, wherein said disk has a tracking disabled area where tracking is not effected and said predetermined position is located in said tracking disabled area.

13. A disk apparatus according to claim 12, wherein said predetermined position is located in an attribute information recording area where an information about attributes of said disk is recorded, and said predetermined position detecting means is an attribute information recording area detecting means.

14. A disk apparatus according to claim 5, further comprising
a second storage means for storing a reference speed information used for reference when it is discriminated whether or not said head reaches a position corresponding to an innermost or outermost periphery, wherein said drive means discriminates, based on an output from said counterelectromotive voltage detecting means, said first target speed information and said reference speed information, whether or not said head reaches the position corresponding to said innermost or outermost periphery of said disk.

15. A disk apparatus according to claim 5, further comprising:
an objective lens fluctuation detecting means for detecting whether or not an objective lens of said head is fluctuated and for outputting a fluctuation detection signal; and
a level discriminating means for discriminating whether or not said fluctuation detection signal has a predetermined level or greater, wherein, when said level discriminating means determines that said fluctuation detection signal has a predetermined level or greater, it is determined that said head reaches the position corresponding to said innermost or outermost periphery of said disk.

16. A disk apparatus according to claim 8, further comprising
an access end discriminating means for outputting an access finish signal indicating that access of said head to said predetermined position is finished wherein said drive means starts supplying said drive signal to said second voice coil motor when receiving said access end signal.

17. A disk apparatus according to claim 16, wherein said disk has a tracking disabled area where tracking is not effected and said predetermined position is located in said tracking disabled area.

18. A disk apparatus according to claim 17, wherein said predetermined position is located in an attribute information recording area where an information about attributes of said disk is recorded, and said predetermined position detecting means is an attribute information recording area detecting means.

19. A disk apparatus according to claim 3, further comprising:
a predetermined position detecting means for detecting that said head accesses said predetermined position; and
an inner or outer periphery detecting means for outputting a signal indicative of arrival of said head at an inner or outer periphery of said disk when said head reaches the position corresponding to said innermost or outermost periphery of said disk, wherein said storage means stores a first target speed information used for reference when said head is moved to said innermost or outermost periphery of said disk, a second target speed information used for reference when said head is moved from said innermost or outermost periphery of said disk to said tracking disabled area, and a third target speed information used for reference when said head accesses said tracking disabled area, wherein said drive means controls, when an access command to make said head access said predetermined position is input thereto, said switching means so that said drive signal should be output only to said first voice coil motor, controls said first voice coil motor based on an output from said counterelectromotive voltage detecting means and said first target speed information until said head reaches a position allowing said inner or outer periphery detecting means to output said signal indicative of arrival of said head at said inner or outer periphery, controls said first voice coil motor based on said output from said counterelectromotive voltage detecting means and said second target speed information until said head accesses a position allowing said predetermined position detecting means to detect said predetermined position from the position allowing said inner or outer periphery detecting means to output said signal indicative of arrival of said head at said inner or outer periphery, and controls said first voice coil motor based on the output from said counterelectromotive voltage detecting means and said third target speed information until said predetermined position detecting means detects that said head accesses said predetermined position.

20. A disk apparatus according to claim 19, wherein said disk has a tracking disabled area where tracking is not effected and said predetermined position is located in said tracking disabled area.

21. A disk apparatus according to claim 20, wherein said predetermined position is located in an attribute recording area where information about attributes of said disk is recorded, and said predetermined position detecting means is an attribute information recording area detecting means.

22. A disk access method of accessing a predetermined position on a disk in a disk apparatus having a first voice coil motor as a drive source used when a head is moved in the radius direction of said disk and a second voice coil motor as a drive source used when said head is moved in the radius direction of said disk, comprising:

a counterelectromotive voltage detecting step of detecting a counterelectromotive voltage from said second voice coil motor;

a first target movement speed referring step of referring to a first target movement speed of said head used when said head is moved toward an innermost or outermost periphery of said disk;

a first head moving step of driving said first voice coil motor based on said counterelectromotive voltage and said first target speed to move said head to said innermost or outermost periphery;

a detecting step of detecting that said head reaches a position corresponding to said innermost or outermost periphery;

second target movement speed referring step of referring a second target movement speed of said head used when said head is moved from said innermost or outermost periphery to said predetermined position;

a second head moving step of driving said second voice coil motor based on said counterelectromotive voltage and said second target movement speed to move said head to said predetermined position; and a predetermined position detecting step of detecting that said head reaches said predetermined position.

23. A disk access method according to claim 22, wherein said disk has a tracking disabled area where tracking is not effected and said predetermined position is located in said tracking disabled area.

24. A disk access method according to claim 23, wherein said predetermined position is located in an attribute recording area where information about attributes of said disk is recorded.

25. A disk access method of making a head accessing a predetermined position on a disk in a disk apparatus having a first voice coil motor as a drive source used when said head is moved in the radius direction of said head and a second voice coil motor as a drive source used when said head is moved in the radius direction of said disk, comprising:

a counterelectromotive voltage detecting step of detecting a counterelectromotive voltage from said second voice coil motor; and a head moving step of driving only said first voice coil motor based on said counterelectromotive voltage to move said head to said predetermined position.

26. A disk access method according to claim 25, wherein said disk has a tracking disabled area where tracking is not effected and said predetermined position is located in said tracking disabled area.

27. A disk access method according to claim 26, wherein said predetermined position is located in an attribute recording area where information about attributes of said disk is recorded.

28. A disk access method of making a head accessing a predetermined position on a disk in a disk apparatus having a first voice coil motor as a drive source used when said head is moved in the radius direction of said head and a second voice coil motor as a drive source used when said head is moved in the radius direction of said disk, comprising:

a target movement speed referring step of referring to a target movement speed of said head at said predetermined position;

a counterelectromotive voltage detecting step of detecting a counterelectromotive voltage from said second voice coil motor;

a head moving step of driving said first voice coil motor based on said counterelectromotive voltage and said target movement speed to move said head to said predetermined position; and an access step of making said head accessing said predetermined position.

29. A disk access method according to claim 28, wherein said disk has a tracking disabled area where tracking is not effected and said predetermined position is located in said tracking disabled area.

30. A disk access method according to claim 29, wherein said predetermined position is located in an attribute recording area where information about attributes of said disk is recorded.

* * * * *